(12) United States Patent
Harkonen et al.

(10) Patent No.: US 11,047,330 B2
(45) Date of Patent: Jun. 29, 2021

(54) DEVICE FOR MODIFYING THE AMOUNT OF FUEL COMBUSTED FOR AN ELECTRONICALLY FUEL INJECTED COMBUSTION ENGINE

(71) Applicant: StepOne Tech Ltd, Pirkkala (FI)

(72) Inventors: Risto Harkonen, Akaa (FI); Miika Holtta, Akaa (FI); Tuomo Isokivijarvi, Tampere (FI); Pekka Salo, Pirkkala (FI)

(73) Assignee: StepOne Tech Ltd, Pirkkala (FI)

( * ) Notice: Subject to any disclaimer, the term of this patent is extended or adjusted under 35 U.S.C. 154(b) by 0 days.

(21) Appl. No.: 16/696,230

(22) Filed: Nov. 26, 2019

(65) Prior Publication Data
US 2021/0079868 A1 Mar. 18, 2021

Related U.S. Application Data

(63) Continuation of application No. 16/570,607, filed on Sep. 13, 2019.

(51) Int. Cl.
*F02D 41/30* (2006.01)

(52) U.S. Cl.
CPC .............................. *F02D 41/3005* (2013.01)

(58) Field of Classification Search
CPC ....... F02D 41/30; F02D 41/3005; F02D 28/00
USPC ........ 123/1 A, 3, 27 GE, 525–527, 575–577, 123/472, 476, 480, 486, 488, 491; 701/102–105, 113, 115
See application file for complete search history.

(56) References Cited

U.S. PATENT DOCUMENTS

| | | | | |
|---|---|---|---|---|
| 4,955,345 A * | 9/1990 | Brown | ................... | F02D 19/087 123/381 |
| 5,003,956 A * | 4/1991 | Iwamoto | ................ | F02D 41/222 123/494 |
| 5,018,483 A * | 5/1991 | Kashima | ............... | F02D 19/084 123/1 A |
| 7,845,315 B2 * | 12/2010 | Leone | ................ | F02M 25/0228 123/1 A |
| 10,519,906 B2 | 12/2019 | Truax | | |
| 2004/0078134 A1 * | 4/2004 | Yin | ......................... | F02D 41/26 701/104 |
| 2009/0164102 A1 * | 6/2009 | Olbrich | .................. | F02D 41/222 701/103 |
| 2010/0332104 A1 * | 12/2010 | Griese | ................... | F02D 19/084 701/102 |
| 2011/0125383 A1 * | 5/2011 | Vassallo | .............. | F02D 41/1458 701/99 |
| 2011/0288746 A1 * | 11/2011 | Carr | ...................... | F02D 41/064 701/103 |
| 2013/0345951 A1 * | 12/2013 | Zyla | ..................... | F02D 41/3836 701/104 |
| 2017/0314483 A1 * | 11/2017 | Brewbaker | ......... | F02D 41/0072 |
| 2017/0341603 A1 * | 11/2017 | Milliken | ................ | G01C 25/00 |

* cited by examiner

*Primary Examiner* — John Kwon
*Assistant Examiner* — Johnny H Hoang
(74) *Attorney, Agent, or Firm* — Stoyanov Law PLLC; Roy L. Chan (57) ABSTRACT

A device that enables gasoline internal combustion engines to efficiently use fuel with higher ethanol content. The device measures various data such as ethanol content, RPM, temperature, intake air pressure, mass airflow, exhaust gas, crank sensor, among other data, to determine to an ideal enrichment pulse duration to apply to the fuel injector.

26 Claims, 10 Drawing Sheets

| RPM/LOAD compensation(%) | | | | | | | | | | | | |
|---|---|---|---|---|---|---|---|---|---|---|---|---|
| [Bar] | 1200 | 1680 | 2160 | 2640 | 3120 | 3600 | 4080 | 4560 | 5040 | 5520 | 6400 | |
| 1.5 | 100 | 100 | 100 | 100 | 100 | 100 | 100 | 100 | 100 | 100 | 100 | |
| 1.3 | 100 | 100 | 100 | 100 | 102 | 100 | 95 | 92 | 100 | 100 | 100 | |
| 1.2 | 100 | 100 | 100 | 100 | 104 | 100 | 90 | 85 | 100 | 100 | 100 | |
| 1.0 | 100 | 100 | 100 | 100 | 104 | 100 | 90 | 83 | 97 | 97 | 97 | |
| 0.9 | 100 | 100 | 100 | 100 | 103 | 100 | 93 | 88 | 92 | 90 | 92 | |
| 0.7 | 100 | 100 | 100 | 100 | 100 | 100 | 100 | 100 | 85 | 80 | 85 | A |
| 0.6 | 100 | 100 | 100 | 100 | 100 | 100 | 100 | 100 | 94 | 81 | 85 | |
| 0.4 | 100 | 100 | 100 | 100 | 100 | 100 | 100 | 100 | 100 | 87 | 89 | |
| 0.2 | 100 | 100 | 100 | 100 | 100 | 100 | 100 | 100 | 100 | 98 | 98 | |
| 0.1 | 100 | 100 | 100 | 100 | 100 | 100 | 100 | 100 | 100 | 100 | 100 | |
| -0.1 | 100 | 100 | 100 | 100 | 100 | 100 | 100 | 100 | 100 | 100 | 100 | |

DEVICE FOR MODIFYING THE AMOUNT OF FUEL COMBUSTED FOR AN ELECTRONICALLY FUEL INJECTED COMBUSTION ENGINE

CROSS-REFERENCE TO RELATED APPLICATIONS

This application is a continuation of U.S. patent application Ser. No. 16/570,607, filed Sep. 13, 2019.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention is related to a device for modifying the amount of fuel combusted for an electronically fuel injected combustion engine. The present invention is further related to enabling a user to alter the operation of the device to allow modification of the amount of combusted fuel to achieve a desired engine operation characteristics. The present invention is further related to enabling a user to monitor the operation of the device and of the engine with the modified amount of combusted fuel.

BRIEF SUMMARY OF THE INVENTION

In an embodiment of the present invention, a device for modifying an amount of fuel combusted for an electronically fuel injected gasoline combustion engine comprises a control unit, a wiring harness, a fuel ethanol sensor, an ECU-fuel injector connector, and a plurality of engine sensor connectors. The ECU-fuel injector connector comprises an ECU connector and a fuel injector connector. The control unit is in communication with the fuel ethanol sensor through the wiring harness. The control unit is in communication with the ECU-fuel injector connector through the wiring harness. The ECU connector is configured to be in communication with an ECU of the electronically fuel injected gasoline combustion engine. The fuel injector connector is configured to be in communication with a fuel injector of the electronically fuel injected gasoline combustion engine. The fuel ethanol sensor determines an ethanol content of fuel of the electronically fuel injected gasoline combustion engine. The control unit is in communication with plurality of engine sensor connectors through the wiring harness. The plurality of engine sensor connectors is in communication with at least one sensor of the electronically fuel injected gasoline combustion engine. The at least one sensor is selected from the group consisting of intake air pressure sensor, mass airflow sensor, exhaust gas lambda sensor, crank sensor and combinations thereof. The control unit comprises a microcontroller comprising at least one processor unit, at least one memory unit coupled to the at least one processor unit, and, computer readable instructions embodied in the memory unit and executable by the processor unit, wherein execution of the instructions by the processor unit causes the control unit to perform a method of calculating an ideal enrichment pulse duration, the method comprising receiving the ethanol content from the fuel ethanol sensor, receiving at least one sensor value from the at least one sensor, receiving an RPM value from the ECU, utilizing the ethanol content and an ethanol lookup table to determine an ethanol pulse correction, utilizing the at least one sensor value and the RPM value to determine a fuel injection correction value from a MAP lookup table, applying the fuel injection correction value to the ethanol pulse correction to determine an ideal enrichment pulse correction, applying the ideal enrichment pulse correction to an ECU pulse signal to calculate an ideal enrichment pulse duration, and applying the ideal enrichment pulse duration to the fuel injector.

In another embodiment of the present invention, the device for modifying an amount of fuel combusted for an electronically fuel injected gasoline combustion engine may further comprise an engine temperature sensor. Upon starting the electronically fuel injected gasoline combustion engine, the method of calculating an ideal enrichment pulse duration may further comprise receiving an engine temperature value from the engine temperature sensor.

In yet another embodiment of the present invention, the control unit may further comprise a remote connection processor and a remote connection.

In another embodiment of the present invention, the MAP lookup table is modified with an enabled computing device. The enabled computing device is selected from the group consisting of tablet computers, laptop computers, personal computers and smart phones.

In yet another embodiment of the present invention, the remote connection is an antenna, and the MAP lookup table is modified wirelessly.

In another embodiment of the present invention, the remote connection is a wired connection port, and the MAP lookup table is modified with a wired connection.

BRIEF DESCRIPTION OF THE SEVERAL VIEWS OF THE DRAWING

The advantages and features of the present invention will be better understood as the following description is read in conjunction with the accompanying drawings, wherein.

For clarity purposes, all reference numerals may not be included in every figure.

DETAILED DESCRIPTION OF THE INVENTION

Gasoline powered internal combustion engines are designed to use regular gasoline with low ethanol content.

The ethanol content in regular gasoline is very low (max. 10%) compared to ethanol fuels where majority of the fuel content is ethanol. Using ethanol fuels in these engines is possible if various characteristics of the fuel injection process can be altered.

If ethanol fuel is desired to be used in a gasoline combustion engine the amount of fuel combusted needs to be increased with a certain ratio that's dependent on the ethanol content of the fuel. The amount of fuel combusted can be changed by modifying the duration of the injection pulses. The duration of the pulses needs to be increased if the ethanol content of the fuel is increased.

The present invention solves this by monitoring the ethanol content of the fuel and by changing the duration of each injector pulse separately by interfacing with the fuel injection ECU (Engine/Electronic Control Unit). The present invention contains algorithms that use variables for changing the injector pulses, and the values of those variables can be adjusted. To perform adjustments to the variables various data can be utilized, including for example, various sensor data from the engine. For example, the adjustments can be done with a personal computer or with mobile devices by using wired or wireless connection. To perform adjustments, dedicated software may be installed to the computer or mobile device.

The present invention is a device that enables modifying a fuel injected gasoline combustion engines to function with ethanol based fuels, and also enables tuning of the fuel injection with the possibility to change its characteristics (or settings) with a computer or a mobile device depending on the ethanol content in the fuel (by utilizing, e.g., lookup tables). The operation of the present invention is in part based on the ethanol sensor provided as part of the device. To optimize the device operation the device can also benefit from other information, including engine temperature and other engine sensor data sourced from the engine's own sensors, RPM, exhaust compositions, external temperature, humidity, velocity, acceleration, and various other data. Such data can for example come from one or more intake air pressure sensor, mass air flow sensor, exhaust gas lambda sensor, crank sensor RPM data, weight sensors, and various other sensors, internal or external to the engine, and even remote sensors. The sensor list is not limiting, and is only provided as an example, as numerous sensors are available today to measure, calculate, extrapolate, and/or record just about type of data and the availability of sensors and their applicability will be known to a person with experience in the field of this invention.

Figures 1, 2:
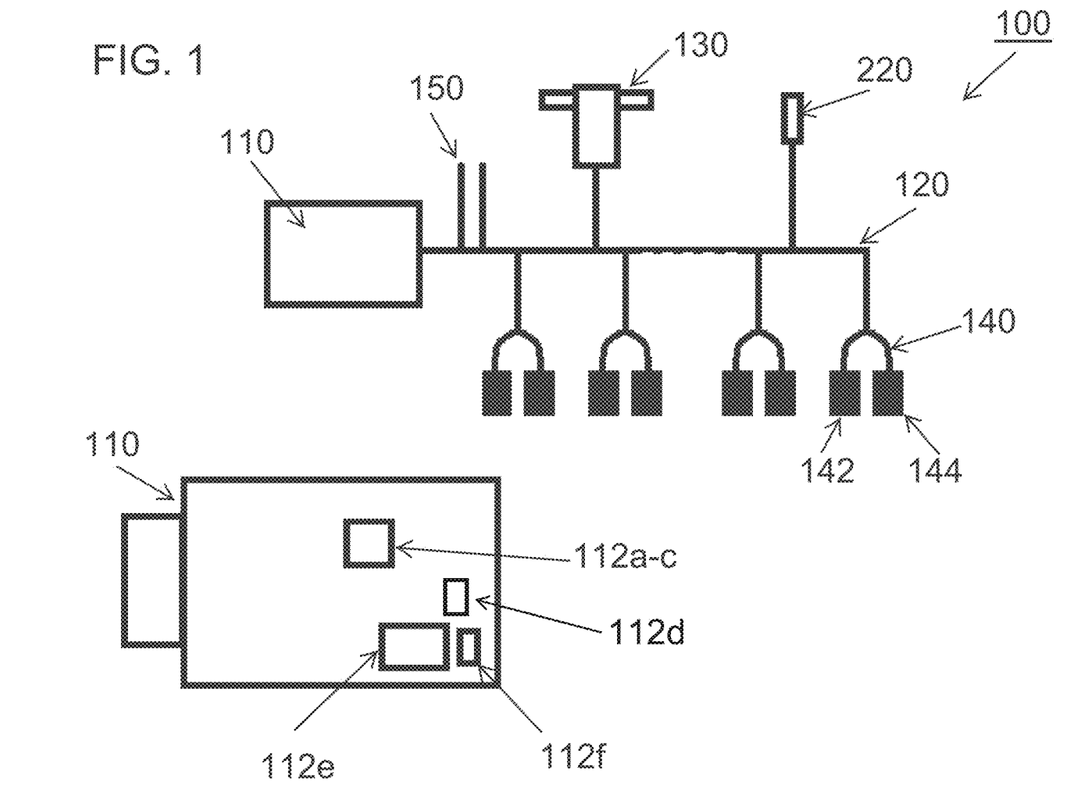
FIG. 1 is an embodiment of the present invention.
FIG. 2 is an embodiment of the microcontroller of the present invention.
Figure 3:
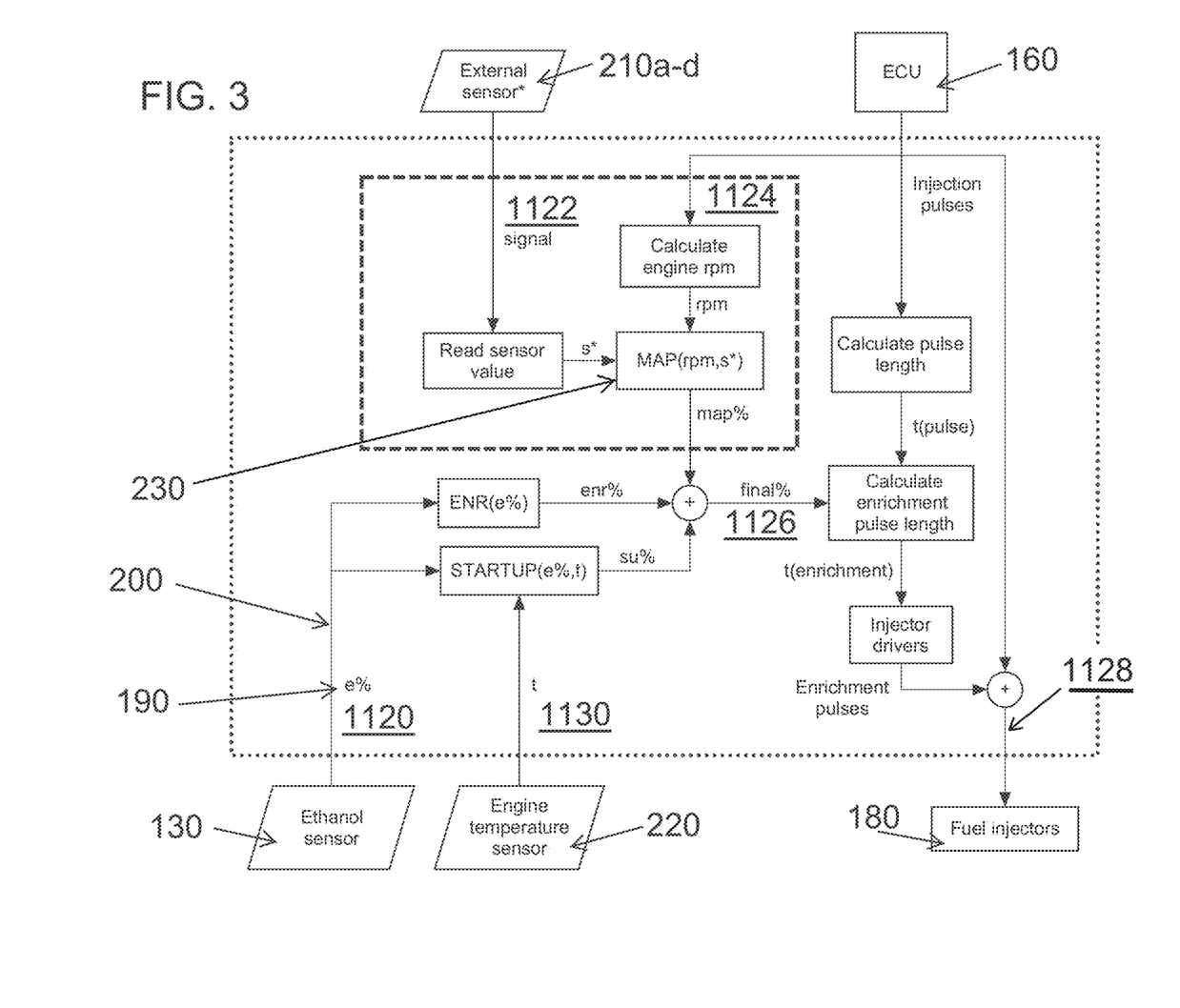
FIG. 3 is an embodiment of the present invention.

As shown in FIGS. 1-3, an embodiment of the present invention is a device 100 for modifying an amount of fuel combusted for an electronically fuel injected gasoline combustion engine comprising a control unit 110, a wiring harness 120, a fuel ethanol sensor 130 and an ECU-fuel injector connector 140 and one or more sensor connectors 150, which may be connected to engine, ECU, and/or other sensors. The ECU-fuel injector connector 140 comprises an ECU connector 142 and a fuel injector connector 144. The control unit 110 is in communication with the fuel ethanol sensor 130 through the wiring harness 120. The control unit 110 is in communication with the ECU-fuel injector connector 140 through the wiring harness 120. The ECU connector 142 is configured to be in communication with ECU 160 of the electronically fuel injected combustion engine. The phrase "configured to be in communication" here means that the ECU connector 142 may be connected to the ECU 160 with the appropriate mated connector.

The fuel injector connector 144 is configured to be in communication with a fuel injector 180 of the electronically fuel injected gasoline combustion engine. Similarly, the phrase "configured to be in communication" here means that the fuel injector connector 144 may be connected to the fuel injector 180 with the appropriate mated connector.

The fuel ethanol sensor 130 determines an ethanol content 190 of fuel (e.g., in a fuel line 200) of the electronically fuel injected gasoline combustion engine. The control unit 110 is in communication with plurality of sensor connectors 150 through the wiring harness 120. The plurality of sensor connectors 150 preferably is in communication with at least one sensor 210 of the electronically fuel injected gasoline combustion engine. The at least one sensor 210 may be selected from the group consisting of intake air pressure sensor 210a, mass airflow sensor 210b, exhaust gas lambda sensor 210c, crank sensor 210d, and combinations thereof. The sensor connectors 150 may also be connected to other sensors, for example, ambient temperature, humidity, weight, velocity, speed, acceleration, and multiple others.

Figure 4:
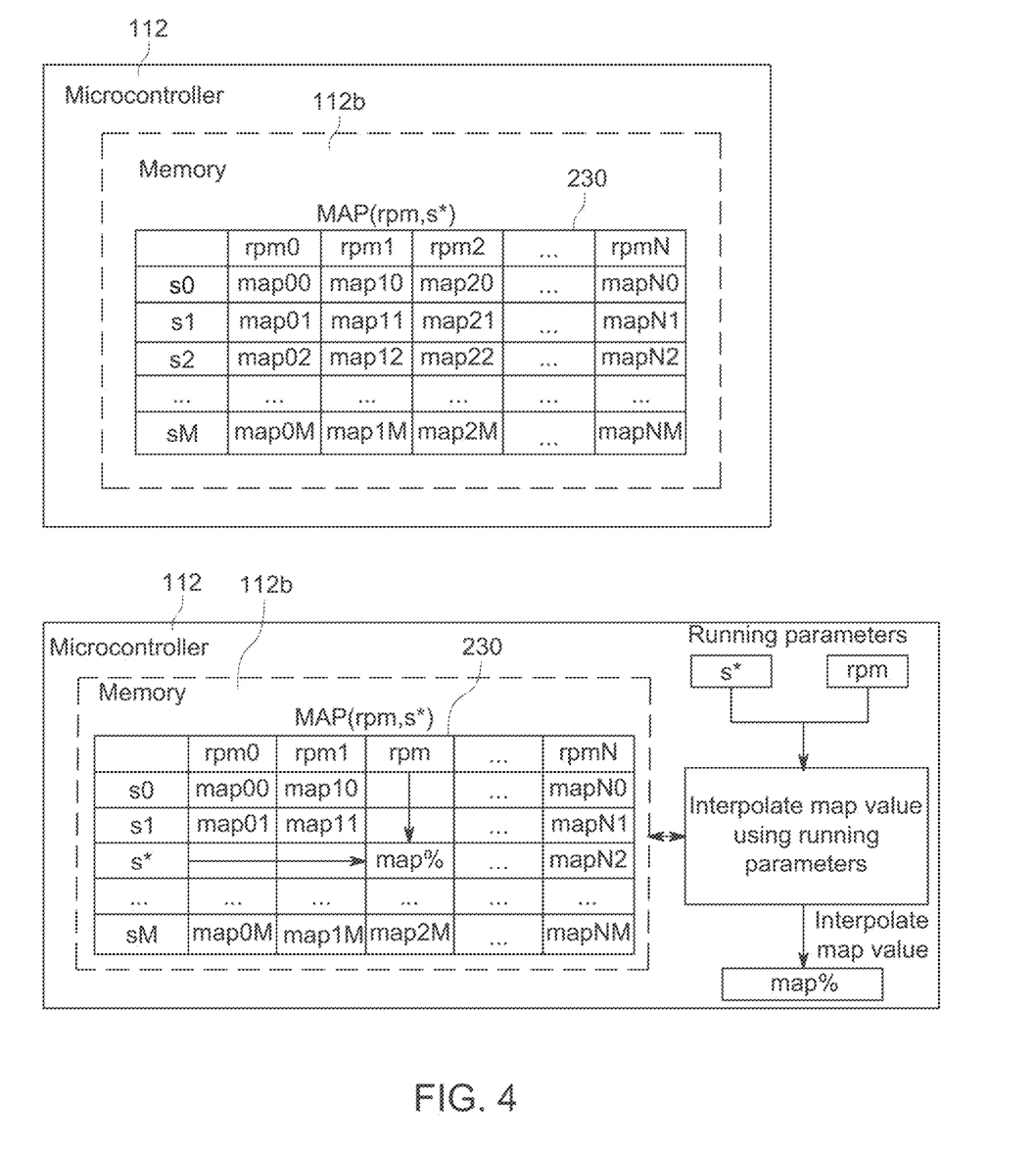
FIG. 4 is an embodiment of a MAP lookup table of the present invention.

As shown in FIGS. 2-4, the control unit 110 comprises a microcontroller 112 that comprises at least one processor unit 112a, at least one memory unit 112b coupled to the at least one processor unit 112a, and computer readable instructions embodied in the memory unit 112b and executable by the processor unit 112a, wherein execution of the instructions by the processor unit causes the control unit 110 to perform a method of calculating an ideal enrichment pulse duration. By ideal enrichment pulse duration here it is meant a fuel injection pulse duration that alters the engine operation to achieve, for example, efficient engine operation, increased power, reduced emissions, and various other goals, as desired by a user.

A method of calculating according to the present invention comprises receiving data about ethanol content of the fuel (e %) from the fuel ethanol sensor 1120, utilizing e % and an ethanol content fuel lookup table (ENR(e %)) to determine an ethanol pulse correction (enr %), and optionally receiving at least one sensor value from the at least one sensor 1122, optionally receiving an RPM value from the ECU 1124, utilizing the at least one sensor value and the RPM value to determine a fuel injection correction value (map %) using MAP lookup table 230. The method of calculating further comprises applying the fuel injection correction value (map %) to ethanol pulse correction (enr %) to determine an ideal enrichment pulse correction (final %) 1126, applying the ideal enrichment pulse correction 1126 to the ECU Pulse Signal t(pulse) to calculate an ideal enrichment pulse duration 1128, and applying the ideal enrichment pulse duration 1128 to the fuel injectors 180. The predetermined values in the fuel lookup table ENR(e %) allow the engine to be used with different ethanol content fuels without the need of sensor inputs or RPM values. Map lookup table 230 allows fine tuning of the fuel mixture utilizing optional inputs from various sensors and/or from the ECU.

Instead of, or in addition to, a MAP lookup table 230, the control unit 110 can also be configured to calculate the ideal enrichment pulse correction 1126 based on algorithms implemented with computer readable instructions stored in memory unit 112b. As noted above, the amount of fuel combusted can be changed by modifying the duration of the injection pulses. For the engine to operate as desired (e.g., more efficiently, optimize fuel consumption, increase horsepower, etc.), the duration of the fuel injection pulses may be altered (e.g., increased or decreased) if the ethanol content of the fuel changes.

As illustrated in FIG. 3, the device 100 for modifying an amount of fuel combusted for an electronically fuel injected gasoline combustion engine may further comprise an engine temperature sensor 220. Upon starting the electronically fuel injected gasoline combustion engine, the method of calculating an ideal enrichment pulse duration may further comprise receiving an engine temperature value from the engine temperature sensor 1130, utilizing the engine temperature sensor value and e % to determine a startup fuel correction (su %) and applying the startup fuel correction su % to ethanol pulse correction (enr %). The RPM value upon starting the electronically fuel injected gasoline combustion engine is zero. After the engine is started, the device 100 for modifying an amount of fuel combusted for an electronically fuel injected gasoline combustion engine may determine the RPM value after the first two injection pulses if the optional RPM value is desired to be used to determine a fuel injection correction value (map %) during startup. The RPM value may be calculated from the injection pulse interval. Usually, the injection pulse is given once every two engine cycles in each fuel injector 180. Alternatively, the injection pulse is given once every one engine cycle. The engine temperature sensor 220 preferably should be located within approximately 10 cm (4 in) of a cylinder head of the engine.

Figure 5:
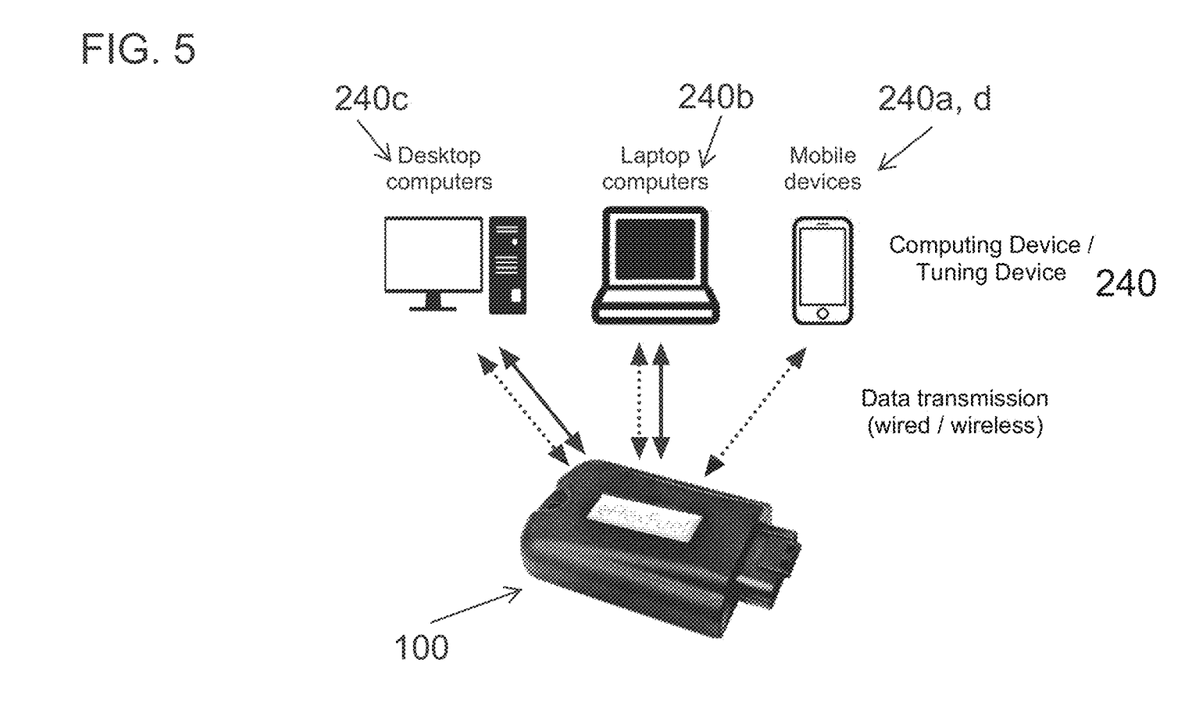
FIG. 5 is an embodiment of the present invention.

As illustrated in FIG. 2, the control unit 110 may further comprise a remote connection processor 112e and a remote connection antenna 112f. As shown in FIG. 5, the MAP lookup table 230 may be modified with an enabled computing device 240. The enabled computing device 240 is selected from the group consisting of tablet computers 240a (e.g., Apple iPad, Microsoft Surface, Samsung Galaxy Note, and other mobile tablet computing devices), laptop computers 240b, personal computers 240c and smart phones 240d. The MAP lookup table 230 may be modified wirelessly through the use of the remote connection processor 112e and the remote connection antenna 112f.

Alternatively, the MAP lookup table 230 may be modified by a wired connection between the device 100 for modifying an amount of fuel combusted for an electronically fuel injected gasoline combustion engine and an optional wired connection port 112d. The wired connection may be USB, LAN or any other known wired connections.

The device 100 for modifying an amount of fuel combusted for an electronically fuel injected gasoline combustion engine may be connected to the at least one sensor 210 (intake air pressure sensor 210a, mass airflow sensor 210b, exhaust gas lambda sensor 210c, crank sensor 210d of the engine through the plurality of sensor connectors 150. The device 100 may be connected to one or more, or all of these sensors. Even if all are connected, the device 100 may utilize data/sensor readings from one or more, of all of these sensors. The fuel ethanol sensor 130 of the device 100 may be connected to the fuel line to determine the ethanol content 190 of the fuel. As the ethanol content 190 may change, the sensor continually reads the ethanol content 190. When device 100 is not deployed, the engine's ECU 160 is connected to the fuel injector 180 with a fuel injector plug. The ECU calculates the pulse and timing of the fuel injection based on a fuel map for that engine and sends that pulse and timing in the form of an ECU signal to the fuel injector 180. To deploy device 100, the fuel injector plug is removed from the fuel injector 180 and the ECU-fuel injector connector 140 is utilized where the fuel injector plug is attached to the ECU connector 142 of the device 100 and the fuel injector connector 144 is attached to the fuel injector 180. Deploying device 100 in this way allows device 100 to adjust the ECU signal and with that the pulse and timing of the fuel injection, effectively adjusting the fuel map of that engine.

The device 100 may also include an engine temperature sensor 220 that may be utilized to determine the engine temperature when the engine starts. This engine temperature value may be utilized to determine the ideal enrichment pulse duration when starting the engine.

Figure 6:
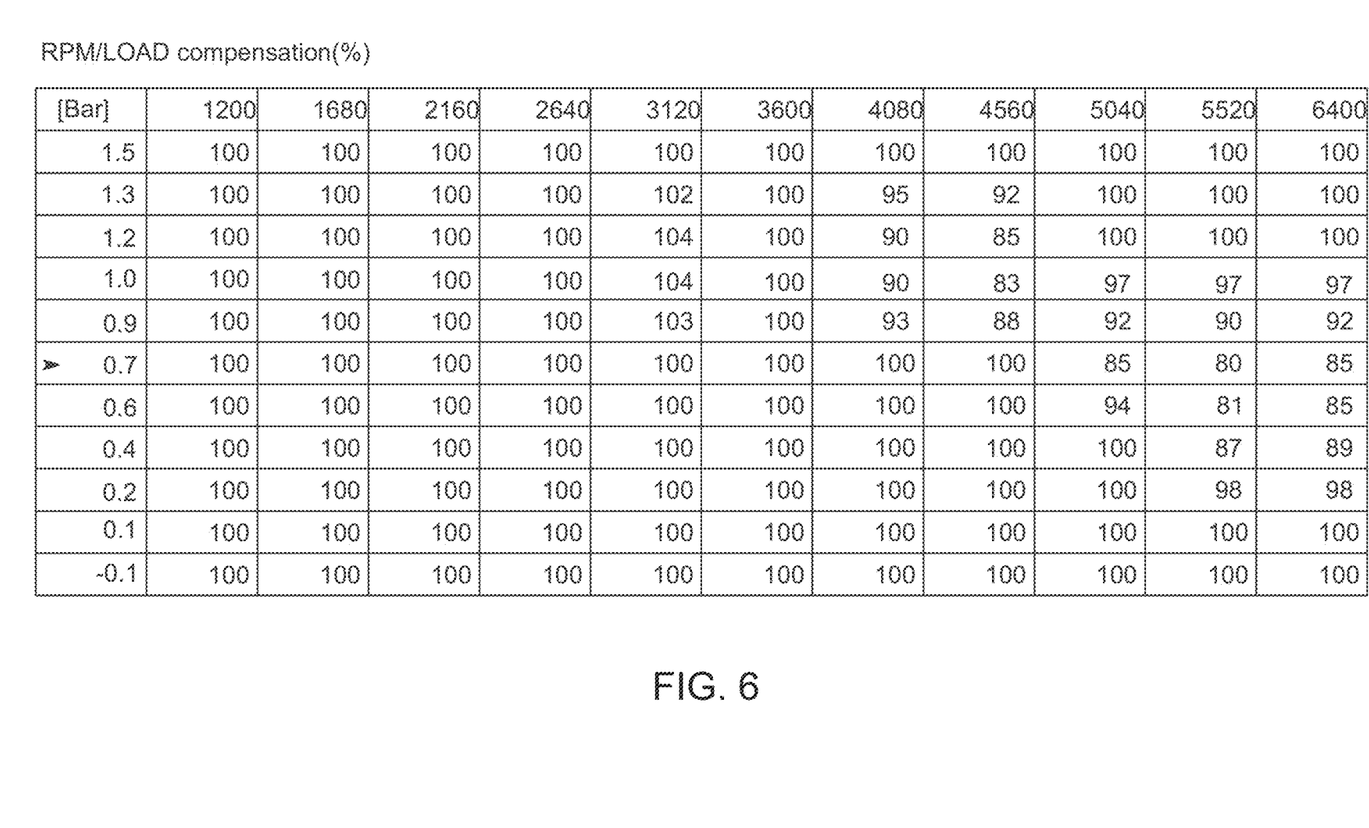
FIG. 6 is an embodiment of an RPM/LOAD compensation log file of the present invention.

The device 100 may include numerous MAP lookup tables 230 and/or log files. FIG. 6 illustrates a representative, RPM/LOAD compensation log file for one embodiment of the present invention. The left column, labeled "[Bar]," represents the engine intake manifold pressure which is read from the MAP (intake air pressure) sensor connected to the device 100 through the engine sensor connector 150. The top row represents the RPM value which is calculated from the ECU injection pulse interval. The cells represent fuel injection correction values (map %) used to modify the ethanol pulse correction (enr %) to determine an ideal enrichment pulse correction 1126, which is applied to ECU Pulse Signal t(pulse) to calculate an ideal enrichment pulse duration 1128. In this example, "100" represents no change to the ethanol pulse correction (enr %), "95" represents −5% to the ethanol pulse correction (enr %) and "105" represents +5% to the ethanol pulse correction (enr %).

For example, if the engine intake manifold pressure is 1.0 bar and the RPM value is 3120, then the fuel correction adjustment value is 104, which means a +4% change to the ethanol pulse correction (enr %). As noted above, the MAP lookup table fuel injection correction values (map %) may be modified with an enabled computing device 240.

Figure 7:
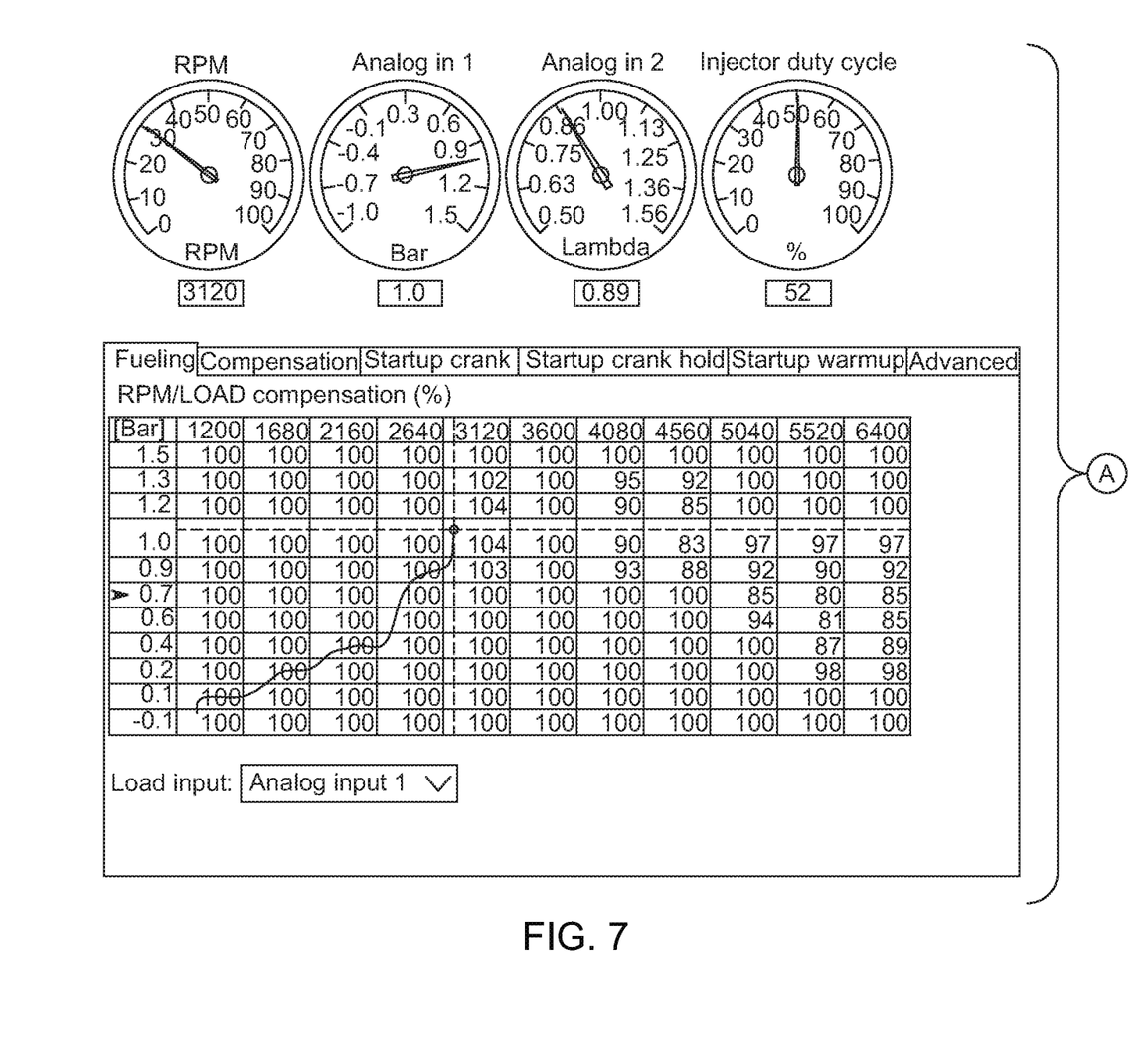
FIG. 7 is an embodiment of a screenshot of the present invention. The figure is divided into a left half and a right half.

FIG. 7 is a representative screenshot illustrating various parameters (e.g., RPM, intake manifold pressure, oxygen sensor input, injection duty cycle, fuel ethanol content, fuel temperature, fuel map, and others) that may be monitored by the device 100. For readability, the figure divides the screenshot between the left side ("FIG. 7") and the right side ("FIG. 7 (cont.)"). The values of the parameters may be viewed on an enabled computing device 240. In this representative example of a screenshot, the RPM value is 3120, the engine intake manifold pressure is 1.0 bar ("Analog in 1"), the exhaust oxygen sensor input is 0.89 Lambda ("Analog in 2"), the injector duty cycle is 52%, the fuel ethanol content is 73%, the fuel temperature is +23 degrees Celsius, and the Fuel Map is 104 Correction % at 11.475 seconds. As indicated in the lower right graph, measurements for the parameters may be recorded by millisecond increments. The measurements for the parameters may be recorded in log files while the engine is running with a power dynamometer. The use of a power dynamometer allows the engine to be run and loaded, simulating driving conditions, while the vehicle is stationary. Based on the readings of the power dynamometer adjustments to the fuel injection correction values (map %) in a MAP lookup table 230 may be made to achieve the desired engine operation (e.g., improve efficiently, optimize fuel consumption, increase horsepower, etc.).

When a power dynamometer is not available for making adjustments to the fuel injection, log files containing internal operating parameters and sensor data may be created using a tuning device 240. For illustration proposes embodiments of the invention are described with a tuning device part of computing device 240, but this illustration is non-limiting, and as explained below the tuning device 240 may be different from the computing device 240. The log files may be created while the vehicle is being driven. The log files may be analyzed, and the fuel injection may be adjusted according to the data saved to the log files. The device 100 may contain memory for saving the log files; alternatively, the data may be transmitted to the tuning device 240 either with a wireless or wired connection. The device 100 may store the data in the log files together with timestamps associated with the data. Device 100 may transmit the log files from its memory to the tuning device 240 either wirelessly or over a wired connection. In another embodiment, the tuning device 240 may receive the data from device 100 and store it in log files together with timestamps associated with the data. The timestamps may be determined by the tuning device 240 which may periodically request (or poll) device 100 for the data or may be received from device 100.

The tuning device 240 maybe part of computing device 240, a separate computing device, a dedicated device for logging and tuning of device 100, or part of a vehicle computer. The tuning device 240 is configured to receive data from device 100 with wireless or wired connection, to organize the data in log files and to save the log files. The tuning device 240 and device 100 may be configured so that device 100 may receive a log file from the tuning device 240 and save the log file in the memory of device 100. Furthermore, the tuning device 240 and device 100 may be configured so that the tuning device 240 can receive a log file stored in device 100. The configurations that enable data transfer between the tuning device 240 and device 100 may be wired or wireless and can follow any known data connection standard or protocol.

The tuning device 240 may contain data collection modules that receive data from device 100, or determine data from the tuning device 240's sensors (e.g., GPS-location, acceleration, speed, altitude, heading, user logged-in, environmental temperature, humidity, and various other information commonly available through mobile or non-mobile computing devices). The data collection modules of the tuning device 240 described above may be software instructions, hardware elements or combination of both and may be commonly available modules (e.g., wireless transceivers, microprocessor clocks, gyros, pressure sensors, compasses, RFID devices, GPS sensors, mapping software, applications for GPS-positioning, altitude measurement, speed calculation, and numerous others that can be found in computing devices), or can also be custom created for incorporation in a tuning device 240 consistent with this invention. The tuning device 240 further may contain logging modules that organize the data received from device 100 and/or the data determined from the tuning device 240 into one or more log files and store the log files on the tuning device 240 memory and/or transmit it to device 100 for storing. Tuning device 240 may record in the log files timestamps associated with the data determined from the tuning device 240. The logging modules of the tuning device 240 may be based on software instructions, hardware devices, or combination of software and hardware.

A log file may contain values for various engine parameters recorded at different times. A log file may visually be represented as follows:

TABLE 1

| Time Stamp | Data 0 | Data 1 | Data 2 | Data 3 | ... | Data N |
|---|---|---|---|---|---|---|
| Time 0 | value | value | Value | value | | value |
| Time 1 | value | value | Value | value | | value |
| Time 2 | value | value | Value | value | | value |
| Time 3 | value | value | Value | value | | value |
| ... | | | | | | |

The left most column of the above diagram contains the time stamps when the values for the various parameters were recorded. The top row in the above log diagram indicates the different parameters being logged (e.g., Data 0, Data 1, etc.), may, for example be speed, RPM, Injector duty cycle, Ethanol content, Engine temperature, Fuel temperature, fuel injection correction value (map %), and numerous others, or any other data available from the internal or external sensors. Other parameters and data may be obtained from the tuning device 240 and saved in the log file, including, for example, GPS-position, acceleration, altitude, username, and any other information available from the tuning device 240. The "value" represents the value of the particular parameter recorded at the indicated time. The log files may be saved as a "CSV" (e.g., comma-, tab-, space- or other delimiter-separated values) files in plain text to allow that the log be used with text editors, spreadsheet and graphing tools, databases, and other software tools. Alternatively, the log files may be stored in encrypted formats for enhanced data security or in low-level machine or proprietary formats for increased memory read/write access efficiency. The above examples are not meant to be limiting, and the log can be saved in any file format.

The tuning device 240 may contain logic that allows a user to control the type of data to be recorded in the log file (what are Data 0, Data 1, Data 2, Data 3, etc., in Table 1), the frequency of logging (the time elapsed between Time 0, Time 1, Time 3, etc., in Table 1), the format of the data values (e.g., metric, imperial, raw data, voltage, text, ASCII, etc.), and any other number of configurations that may be desirable or helpful to tune device 100.

The tuning device 240 may further contain display modules that allow the log file to be visually displayed on a display (of a, e.g., computer, tablet, phone or vehicle monitor) connected to the tuning device 240. The display maybe a display of computing device 240, a display of a dedicated tuning device 240, a vehicle display, or an external display connected to the tuning device 240 using well known image or video transmission techniques. The display modules may comprise display logic allowing simple tabular visualization of the log file, similar to Table 1, or may comprise logic that allows visualization of the log file data in graphical form in multiple coordinates or dimensions (e.g., x-y, x-y-z, 2D, 3D, etc.), formats (e.g., pie charts, line graphs, bar graphs, etc.), or colors.

Figure 8:
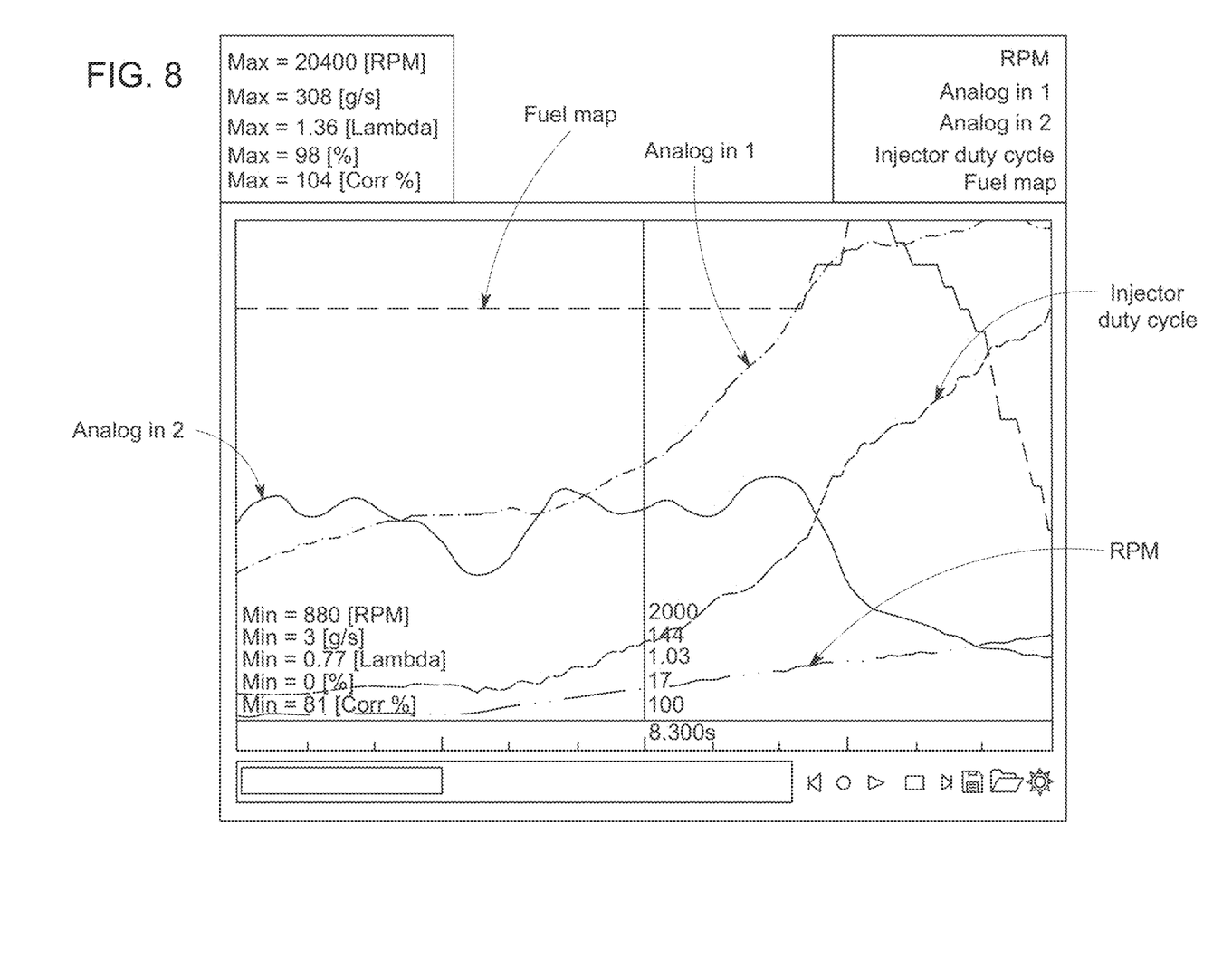
FIG. 8 is an embodiment of a screenshot of the present invention.

FIG. 8 illustrates a representative screenshot of the data from a log file in graphic form. In this example, the log file recorded data in milliseconds, and at 8.300 seconds, the RPM is 2000, "Analog in 1" is 144 g/s, "Analog in 2" is 1.03 Lambda, the Injector duty cycle is 17%, and the Fuel map is 100% Correction. A user may choose a specific time to view the values at the specific time with the controls at the bottom of the figure.

Figure 9:
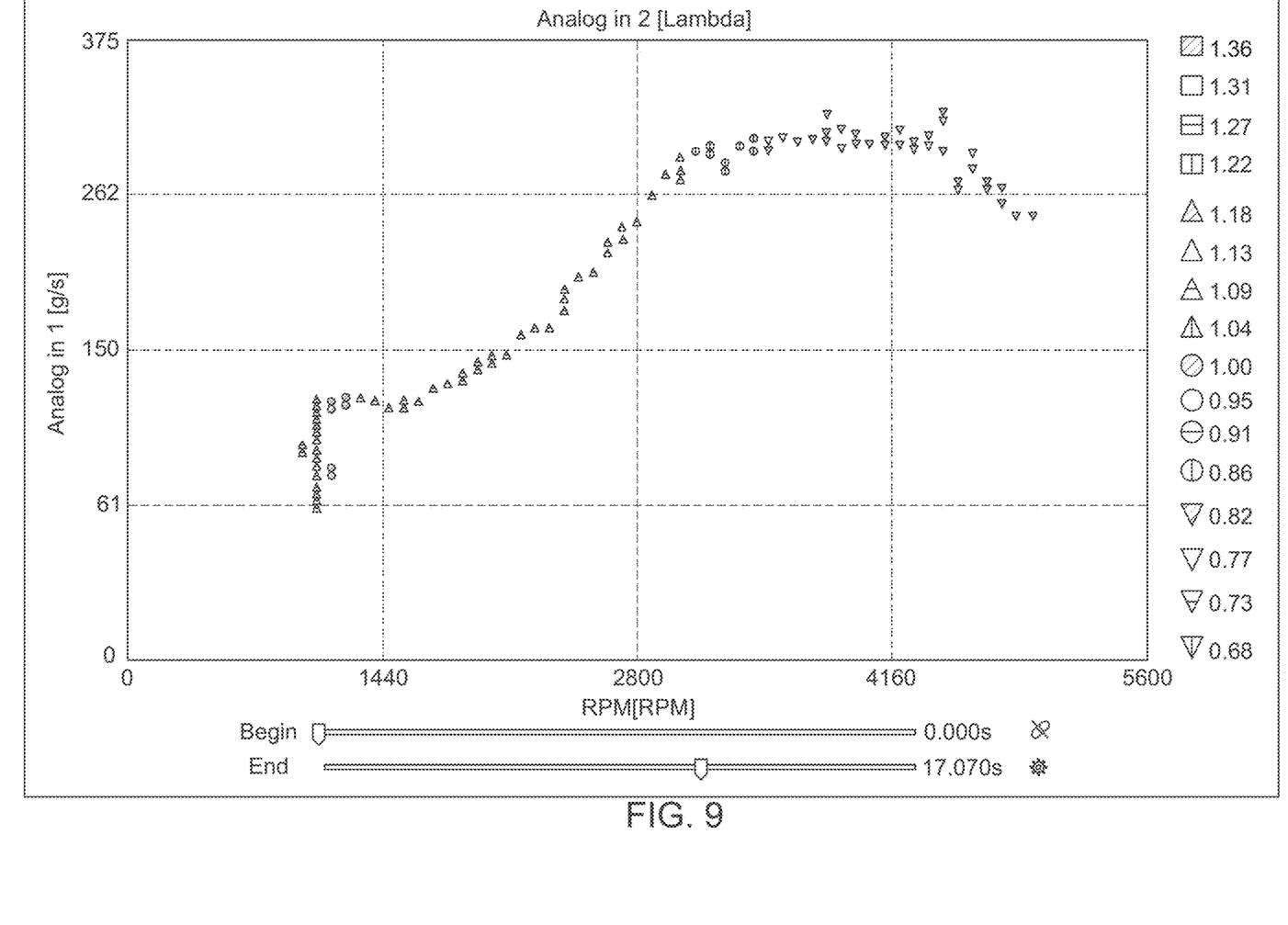
FIG. 9 is an embodiment of a screenshot of the present invention.

FIG. 9 illustrates a representative screenshot of the data from a log file in graphic form. In this example, the graph presents three different channels (RPM (x-axis), Analog in 1 (y-axis, MAF sensor data) and Analog in 2 (z-axis, exhaust gas lambda sensor data)) in a coordinated system. A user may analyze the air-fuel mixture of the engine in relation to the engine's workload. The user may choose a specific time to view the values of the air-fuel mixture at the specific time using the graph controls at the bottom of FIG. 9 (e.g., to pan or zoom in or out or to take a readout at an exact point in time). If the user determines that the logged air-fuel ratio of the mixture should be changed, the user, with or without using algorithms that may be external to the tuning device 240, or installed in the tuning device 240, can determine or calculate a new fuel injection correction value (map %) to adjust the fuel map using the RPM and load values from the log file. Similarly, if the user wishes to change the value of other parameters recorded in the log file, based on the log file data the user can determine or calculate new fuel injection correction values (map %) to engine performance to change the desired parameter's value. Using computing device 240 the user can update MAP lookup table 230 in device 100 with the new fuel injection correction value (map %). The user can determine the fuel injection correction value (map %) to be entered into the MAP lookup table 230 by adjusting the fuel injection correction value (map %) in the direction of desired or expected engine performance change, performing another test or creating a new log with the new fuel injection correction values (map %), analyzing the resulting values of other parameters from the new test or in the new log, and re-adjusting the fuel injection correction values (map %). The process can be repeated as many times as the user wishes to achieve the desired result. Also, through testing and/or recording and analyzing multiple log files created under varying conditions and with varying parameters values, and/or based on scientific principles, algorithms may be created that can be used to calculate the values to be entered in MAP lookup table 230 based on the desired performance.

Figure 10:
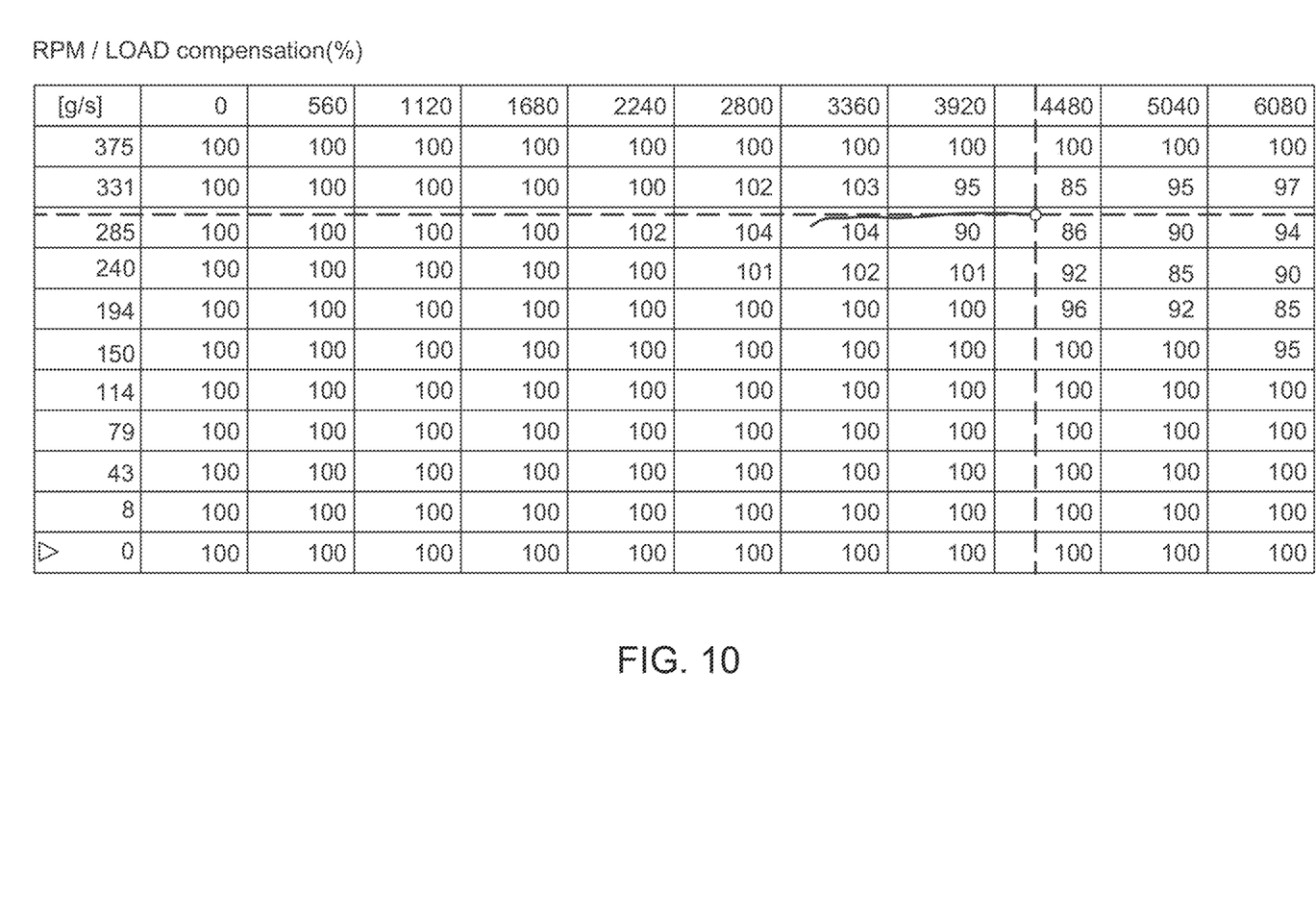
FIG. 10 is an embodiment of an RPM/LOAD compensation log file of the present invention.

The values for the fuel injection correction values (map %) in a MAP lookup table 230 of the device 100 may be changed using log files consistent with the present invention to achieve desired engine operation. FIG. 10, which is similar to FIG. 6, shows representative data from a representative RPM/Load compensation log file. In the figure, the x-axis presents the engine RPM, the y-axis presents the value of the MAF sensor, and the cells represent the amount of fuel injected to the engine measured in percent from the original value. For example, at 4480 RPM and 285 g/s, the adjusted fuel injected is 86% of the original amount of injected fuel. Although the description and figures refer to RPM/Load compensation log files, the present invention may utilize log files with other parameters.

An embodiment of the present invention is a non-transitory computer readable medium having computer readable instructions embodied therein, the computer readable instructions being configured to implement a method of calculating an ideal pulse duration when executed. "Non-transitory computer readable medium" may not include a transitory signal.

While the invention has been described with reference to exemplary embodiments, it will be understood by those skilled in the art that various changes, omissions, and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention is not limited to the particular embodiments disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

We claim:

1. A system for tuning a device connected in-line between an Engine Control Unit ("ECU") and fuel injectors of an electronically fuel injected gasoline combustion engine for adjusting operational characteristics of the electronically fuel injected gasoline combustion engine by modifying an amount of fuel combusted for the electronically fuel injected gasoline combustion engine, the system comprising:
   the device; and,
   a tuning device;
   wherein the device is in communication with the tuning device;
   wherein the device comprises:
      a control unit;
      a memory unit;
      a wiring harness;
      a fuel ethanol sensor;
      an ECU-fuel injector connector, wherein the ECU-fuel injector connector comprises:
         an ECU connector;
         a fuel injector connector; and,
         a plurality of sensor connectors;
   wherein the control unit is in communication with the fuel ethanol sensor through the wiring harness;
   wherein the control unit is in communication with the ECU-fuel injector connector through the wiring harness;
   wherein the ECU connector is configured to be in communication with an ECU of the electronically fuel injected gasoline combustion engine;
   wherein the fuel injector connector is configured to be in communication with a fuel injector of the electronically fuel injected gasoline combustion engine;
   wherein the fuel ethanol sensor determines an ethanol content of fuel of the electronically fuel injected gasoline combustion engine;
   wherein the ethanol content is a value representing a proportion of ethanol in the fuel;
   wherein the control unit is in communication with the plurality of sensor connectors through the wiring harness;
   wherein the plurality of sensor connectors is in communication with at least one sensor of the electronically fuel injected gasoline combustion engine;
   wherein the at least one sensor is selected from the group consisting of intake air pressure sensor, mass airflow sensor, exhaust gas lambda sensor, crank sensor, temperature sensor and combinations thereof; and,
   wherein the control unit is configured to:
      receive the ethanol content from the fuel ethanol sensor;
      receive at least one sensor value from the at least one sensor;
      obtain an RPM value for the internal combustion engine;
      utilize the ethanol content and an ethanol lookup table to determine an ethanol pulse correction;
      utilize the at least one sensor value and the RPM value to determine a fuel injection correction value from a MAP lookup table;
      apply the fuel injection correction value to the ethanol pulse correction to determine an ideal enrichment pulse correction;
      apply the ideal enrichment pulse correction to an ECU pulse signal to calculate an ideal enrichment pulse duration; and,
      apply the ideal enrichment pulse duration to the fuel injector;
   wherein the tuning device comprises:
      a tuning device processor unit; and,
      a tuning device memory unit coupled to the tuning device processor unit; and, wherein the tuning device is configured to:
  receive the ethanol content from the device;
  receive the at least one sensor value from the device;
  receive the RPM value from the device;
  receive the fuel injection correction value from the device;
  create a log file comprising one or more of the ethanol content, the at least one sensor value, the RPM value, and the fuel injection correction value;
  save the log file on the tuning device memory unit; and,
  receive a new fuel injection correction value; and,
  wherein the amount of fuel combusted for the electronically fuel injected gasoline combustion engine is modified based on data from the log file.

2. The system of claim 1, wherein the control unit is further configured to:
  receive the new fuel injection correction value from the tuning device;
  update the MAP look up table with the new fuel injection correction value;
  apply the new fuel injection correction value to the ethanol pulse correction to determine a new ideal enrichment pulse correction;
  apply the new ideal enrichment pulse correction to the ECU pulse signal to calculate a new ideal enrichment pulse duration; and,
  apply the new ideal enrichment pulse duration to the fuel injector.

3. The system of claim 2, wherein the tuning device further comprises a display; and
  wherein the tuning device is further configured to:
    display the log file on the display.

4. The system of claim 2, wherein the tuning device is in wireless communication with the device.

5. The system of claim 2, wherein the tuning device further comprises:
  at least one tuning device sensor; and,
  wherein the tuning device is further configured to:
    receive at least one tuning device sensor value from the at least one tuning device sensor; and,
    add the at least one tuning device sensor value to the log file.

6. The system of claim 2, wherein the tuning device is further configured to:
  record in the log file a timestamp associated with the one or more of the ethanol content, the at least one sensor value, the RPM value, and the fuel injection correction value.

7. The system of claim 6, wherein the tuning device further comprises a display; and
  wherein the tuning device is further configured to:
    represent the log file visually on the display by displaying two or more of the timestamp, the one or more of ethanol content, the at least one sensor value, the RPM value, the ideal enrichment pulse duration, the fuel injection correction value, and the at least one tuning device sensor value.

8. The system of claim 1, wherein the control unit is further configured to:
  store the log file in the memory unit.

9. The system of claim 1, wherein the tuning device further comprises:
  at least one tuning device sensor; and,
  wherein the tuning device is further configured to:
    receive at least one tuning device sensor value from the at least one tuning device sensor; and,
    add the at least one tuning device sensor value to the log file.

10. The system of claim 9, wherein the tuning device further comprises a display; and
  wherein the tuning device is further configured to:
    display the log file on the display.

11. The system of claim 9, wherein the device communicates with the tuning device wirelessly.

12. The system of claim 9, wherein the control unit is further configured to:
  store the log file in the memory unit.

13. The system of claim 9, wherein the tuning device is further configured to:
  record in the log file a timestamp associated with the one or more of ethanol content, the at least one sensor value, the RPM value, the ideal enrichment pulse duration, the fuel injection correction value, and the at least one tuning device sensor value.

14. The system of claim 13, wherein the tuning device further comprises a display; and
  wherein the tuning device is further configured to:
    visually represent the log file on the display by displaying two or more of the timestamp, the one or more of ethanol content, the at least one sensor value, the RPM value, the ideal enrichment pulse duration, the fuel injection correction value, and the at least one tuning device sensor value.

15. The system of claim 13, wherein the control unit is further configured to:
  receive the new fuel injection correction value from the tuning device;
  update the MAP look up table with the new fuel injection correction value;
  apply the new fuel injection correction value to the ethanol pulse correction to determine a new ideal enrichment pulse correction;
  apply the new ideal enrichment pulse correction to the ECU pulse signal to calculate a new ideal enrichment pulse duration; and,
  apply the new ideal enrichment pulse correction to the fuel injector after the end of the pulse width of the ECU Pulse signal.

16. The system of claim 1, wherein the control is unit is further configured to:
  receive a plurality of ECU pulse signals from the ECU; and,
  wherein the RPM value is calculated from an interval between two or more ECU pulse signals from the plurality of ECU pulse signals.

17. A system for tuning a device connected in-line between an Engine Control Unit ("ECU") and fuel injectors of an electronically fuel injected gasoline combustion engine for adjusting operational characteristics of the electronically fuel injected gasoline combustion engine by modifying an amount of fuel combusted for the electronically fuel injected gasoline combustion engine, the system comprising:
  the device; and,
  a tuning device;
  wherein the device is in communication with the tuning device;
  wherein the device comprises:
    a control unit;
    a memory unit;
    a wiring harness;
    an ECU-fuel injector connector, wherein the ECU-fuel injector connector comprises:
      an ECU connector;

a fuel injector connector; and,
a plurality of sensor connectors;
wherein the control unit is configured to be in communication with a fuel ethanol sensor;
wherein the control unit is in communication with the ECU-fuel injector connector through the wiring harness;
wherein the ECU connector is configured to be in communication with an ECU of the electronically fuel injected gasoline combustion engine;
wherein the fuel injector connector is configured to be in communication with a fuel injector of the electronically fuel injected gasoline combustion engine;
wherein the control unit is in communication with the plurality of sensor connectors through the wiring harness;
wherein the plurality of sensor connectors is in communication with at least one sensor of the electronically fuel injected gasoline combustion engine;
wherein the at least one sensor is selected from the group consisting of intake air pressure sensor, mass airflow sensor, exhaust gas lambda sensor, crank sensor, temperature sensor and combinations thereof; and,
wherein the control unit is configured to:
receive an ethanol content of fuel of the electronically fuel injected gasoline combustion engine from the fuel ethanol sensor, wherein the ethanol content is a value representing a proportion of ethanol in the fuel;
receive at least one sensor value from the at least one sensor;
obtain an RPM value for the internal combustion engine;
utilize the ethanol content and an ethanol lookup table to determine an ethanol pulse correction;
utilize the at least one sensor value and the RPM value to determine a fuel injection correction value from a MAP lookup table;
apply the fuel injection correction value to the ethanol pulse correction to determine an ideal enrichment pulse correction;
apply the ideal enrichment pulse correction to an ECU pulse signal to calculate an ideal enrichment pulse duration; and,
apply the ideal enrichment pulse duration to the fuel injector;
wherein the tuning device comprises:
a tuning device processor unit; and,
a tuning device memory unit coupled to the tuning device processor unit; and,
wherein the tuning device is configured to:
receive the ethanol content from the device;
receive the at least one sensor value from the device;
obtain the RPM value for the internal combustion engine;
receive the fuel injection correction value from the device;
create a log file comprising one or more of the ethanol content, the at least one sensor value, the RPM value, and the fuel injection correction value;
save the log file on the tuning device memory unit; and,
receive a new fuel injection correction value; and,
wherein the amount of fuel combusted for the electronically fuel injected gasoline combustion engine is modified based on data from the log file.

18. The system of claim 17, wherein the control unit is further configured to:
receive the new fuel injection correction value from the tuning device;
update the MAP look up table with the new fuel injection correction value;
apply the new fuel injection correction value to the ethanol pulse correction to determine a new ideal enrichment pulse correction;
apply the new ideal enrichment pulse correction to the ECU pulse signal to calculate a new ideal enrichment pulse duration; and,
apply the new ideal enrichment pulse duration to the fuel injector.

19. The system of claim 18, wherein the tuning device further comprises:
at least one tuning device sensor; and,
wherein the tuning device is further configured to:
receive at least one tuning device sensor value from the at least one tuning device sensor; and,
add the at least one tuning device sensor value to the log file.

20. The system of claim 19, wherein the control unit is further configured to:
store the log file in the memory unit.

21. The system of claim 18, wherein the control unit is further configured to:
receive a plurality of ECU pulse signals from the ECU; and,
wherein the RPM value is calculated from an interval between two or more ECU pulse signals from the plurality of ECU pulse signals.

22. A system for tuning a device connected in-line between an Engine Control Unit ("ECU") and fuel injectors of an electronically fuel injected gasoline combustion engine for adjusting the operational characteristics of the electronically fuel injected gasoline combustion engine by modifying an amount of fuel combusted for the electronically fuel injected gasoline combustion engine, the system comprising:
the device; and,
a tuning device;
wherein the device is in communication with the tuning device;
wherein the device comprises:
a control unit;
a wiring harness;
an ECU-fuel injector connector, wherein the ECU-fuel injector connector comprises:
an ECU connector;
a fuel injector connector; and,
a plurality of sensor connectors;
wherein the control unit is configured to be in communication with a fuel ethanol sensor;
wherein the control unit is in communication with the ECU-fuel injector connector through the wiring harness;
wherein the ECU connector is configured to be in communication with the ECU of the electronically fuel injected gasoline combustion engine;
wherein the fuel injector connector is configured to be in communication with a fuel injector of the electronically fuel injected gasoline combustion engine;
wherein the ECU-fuel injector connector is configured to allow the fuel injector to receive from the ECU an injection ECU pulse signal having a pulse width;
wherein the control unit is in communication with the plurality of sensor connectors through the wiring harness;

wherein the plurality of sensor connectors is in communication with at least one sensor of the electronically fuel injected gasoline combustion engine;

wherein the at least one sensor is selected from the group consisting of intake air pressure sensor, mass airflow sensor, exhaust gas lambda sensor, crank sensor, temperature sensor and combinations thereof; and, wherein the control unit comprises:
  a microcontroller comprising:
    at least one processor unit;
    at least one memory unit coupled to the at least one processor unit; and,
    computer readable instructions embodied in the memory unit and executable by the processor unit stored executable instructions to cause the control unit to:
      receive an ethanol content of fuel of the electronically fuel injected gasoline combustion engine from the fuel ethanol sensor, wherein the ethanol content is a value representing the proportion of ethanol in the fuel;
      receive at least one sensor value from the at least one sensor;
      receive a plurality of ECU pulse signals from the ECU;
      calculate an RPM value for the internal combustion engine from an interval between two or more ECU pulse signals from the plurality of ECU pulse signals;
      utilize the ethanol content and an ethanol lookup table to determine an ethanol pulse correction;
      utilize the at least one sensor value and the RPM value to determine a fuel injection correction value from a MAP lookup table;
      utilize the fuel injection correction value and the ethanol pulse correction to determine an ideal enrichment pulse correction;
      apply the ideal enrichment pulse correction to the fuel injector after the end of the pulse width of the injection ECU pulse signal; and, wherein the tuning device comprises:
  a tuning device processor unit; and,
  a tuning device memory unit coupled to the tuning device processor unit; and, wherein the tuning device is configured to:
  receive the ethanol content from the device;
  receive the at least one sensor value from the device;
  obtain the RPM value for the internal combustion engine;
  receive the fuel injection correction value from the device;
  create a log file comprising one or more of the ethanol content, the at least one sensor value, the RPM value, and the fuel injection correction value;
  save the log file on the tuning device memory unit; and,
  receive a new fuel injection correction value; and, wherein the amount of fuel combusted for the electronically fuel injected gasoline combustion engine is modified based on data from the log file.

23. The system of claim 22, wherein the tuning device further comprises:
at least one tuning device sensor; and,
wherein the tuning device is further configured to:
receive at least one tuning device sensor value from the at least one tuning device sensor; and,
add the at least one tuning device sensor value to the log file.

24. The system of claim 22, wherein the tuning device is further configured to record in the log file a timestamp associated with the one or more of the ethanol content, the at least one sensor value, the RPM value, and the fuel injection correction value.

25. The system of claim 22, wherein the control unit is further configured to:
store the log file in the memory unit.

26. The system of claim 22, wherein the tuning device is in wireless communication with the device.

* * * * *